US011106788B2

(12) United States Patent
Walker et al.

(10) Patent No.: US 11,106,788 B2
(45) Date of Patent: Aug. 31, 2021

(54) SECURITY FOR ACTIVE DATA REQUEST STREAMS

(71) Applicant: HEWLETT PACKARD ENTERPRISE DEVELOPMENT LP, Houston, TX (US)

(72) Inventors: William J. Walker, Houston, TX (US); Michael T. Gill, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 177 days.

(21) Appl. No.: 16/183,793

(22) Filed: Nov. 8, 2018

(65) Prior Publication Data
US 2020/0151324 A1  May 14, 2020

(51) Int. Cl.
*G06F 21/82* (2013.01)
*G06F 21/85* (2013.01)
*G06F 21/55* (2013.01)
*G06F 21/62* (2013.01)
G06F 21/70 (2013.01)

(52) U.S. Cl.
CPC ........ *G06F 21/554* (2013.01); *G06F 21/6218* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 6,735,728 B1 | 5/2004 | Tiedemann et al. | |
| 7,877,788 B1 * | 1/2011 | Topp | G06F 21/85 726/4 |
| 8,843,808 B2 | 9/2014 | Jibbe et al. | |
| 9,164,925 B2 * | 10/2015 | Mo | G06F 12/1466 |
| 9,652,464 B2 | 5/2017 | Ogawa | |
| 2002/0144183 A1 | 10/2002 | Abdo et al. | |
| 2003/0115543 A1 | 6/2003 | Emde et al. | |

(Continued)

OTHER PUBLICATIONS

IOCheck: A Framework to Enhance the Security of I/O Devices at Runtime. Zhang. IEEE. (Year: 2013).*

(Continued)

*Primary Examiner* — Venkat Perungavoor
(74) *Attorney, Agent, or Firm* — Nolte Lackenbach Siegel

(57) ABSTRACT

Securing data exchanged between components such as hardware sub-systems of a computing device (e.g., internal communications) during a request-response cycle is desirable. In some implementations, methods and systems as disclosed to secure computing devices against attackers attempting to take physical control of a computer system (or portion thereof) to compromise the system or steal data managed by the computer system. In one example, data transmission request from sender to a receiver may be identified and associated with a unique identifier to individually identify the data transmission request (e.g., a request internal to the computer system). The request may then be provided to the receiver and a later response may be identified and validated prior to returning the response data to the requestor. The validation may include ensuring an associated tag (e.g., unique identifier) is provided with the response to tie it to the request for which the response is being sent.

18 Claims, 9 Drawing Sheets

(56) References Cited

U.S. PATENT DOCUMENTS

| | | | | |
|---|---|---|---|---|
| 2007/0226795 | A1* | 9/2007 | Conti | G06F 21/554 |
| | | | | 726/22 |
| 2014/0025844 | A1* | 1/2014 | Charlton | G06F 21/82 |
| | | | | 710/5 |
| 2014/0051432 | A1* | 2/2014 | Gupta | H04L 63/1466 |
| | | | | 455/425 |
| 2016/0105491 | A1* | 4/2016 | Rottler | H04M 1/72572 |
| | | | | 709/217 |

OTHER PUBLICATIONS

Device Driver Safety Through a Reference Validation Mechanism. Williams et al. Usenix. (Year: 2008).*

Cooling High-speed Chips Using Intelligent Control Technology. Yang et al. IEEE. (Year: 2009).*

Verification of the Cell Broadband Engine™ Processor. Shimizu. ACM. (Year: 2006).*

VIPER: Verifying the Integrity of PERipherals' Firmware. Li. ACM. (Year: 2011).*

Design and Reuse, "Data-in-transit Protection for Application Processors," 2018, pp. 1-15 (online), Retrieved from the Internet on Sep. 5, 2018 at URL: <design-reuse.com/articles/29411/data-in-transit-protection-for-application-processors.html>.

* cited by examiner

SECURITY FOR ACTIVE DATA REQUEST STREAMS

BACKGROUND

The increased number of machines that are now connected to the Internet has caused an increased number of instances where these machines are being compromised by external entities. These external entities, once in control of a compromised machine, often use the access to the compromised machine to perform any number of malicious activities. There are a multitude of ways this compromising can occur. Although typical intrusion techniques involve network based attacks, in some instances, compromising the machine is performed when an attacker gains physical access to the machine. Compromising a machine physically may include actions such as reconfiguring physical connections to hardware to perform the compromising actions. While physically compromising a machine may not be as frequent as a remote (e.g., network) attack, these physical attacks may be even more detrimental to an organization. Of course, physical security is often associated with the location of a machine and this may reduce the number of physical attacks to machines connected to a network. However, once physically compromised, detection may be even more difficult. Further, this type of physical intrusion implies a potentially malicious "insider" of the organization may be involved (or that physical security has been breached). A network connected on premises computer is likely connected physically to a network through a network interface. The network interface represents a piece of hardware installed pervasively in today's computing platforms. Accordingly, a network interface may be a vulnerable part of the computer or a preferred target for attack. Further, once physically compromised, a computer system may be more difficult to diagnose using standard intrusion detection techniques.

To provide for security between processes and devices of a computer system, modern operating systems tend to separate access into what are known as protection rings. The number of rings may differ across operating systems. Typically, the most privileged ring is Ring 0. As the ring number is increased, the less privileges are available to software executing in a ring. For example, applications executing at ring 0 may have full access to a computer system whereas higher rings may have increasingly limited access. The operating system kernel that controls I/O to hardware devices, including but not limited to the network interfaces, typically operates at Ring 0. An attacker that compromises a network interface would conceptually have unfiltered access to everything on a machine given that software executing in the network interface and the kernel both may run at Ring 0. A compromised machine where executable commands are injected at Ring 0 may have no method of controlling access to sensitive data, in part, because Ring 0 controls all programs running at all ring levels.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
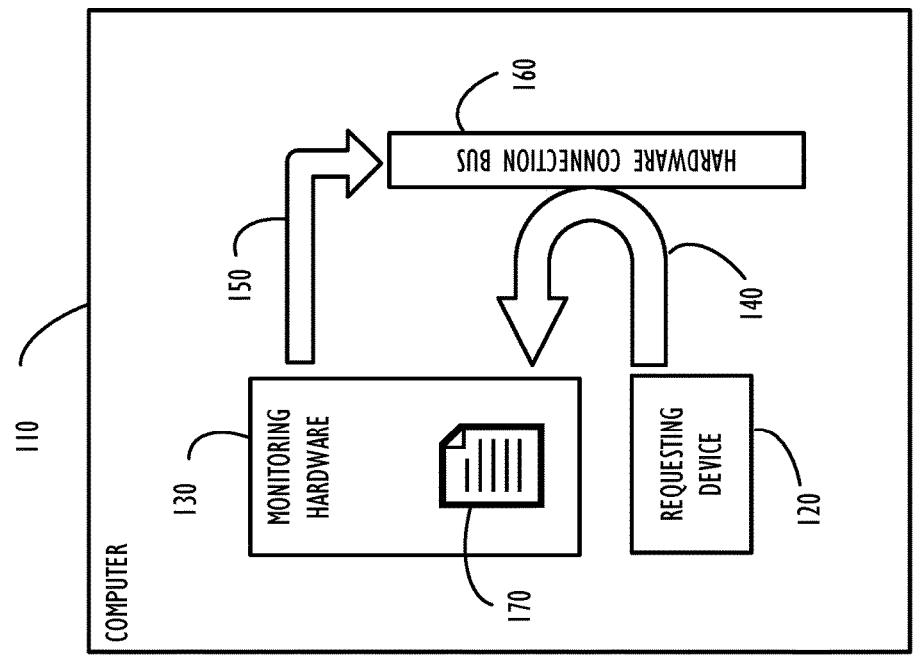
FIG. 1 is a functional block diagram representing an example of a hardware sub-system that facilitates securely delivering a request, according to one or more disclosed implementations.

Examples of the subject matter claimed below will now be disclosed and then a specific non-limiting implementation will be explained with reference to the FIGs. In the interest of clarity, not all features of an actual implementation are described in every example of this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As mentioned above, modern operating systems tend to separate access into what are known as protection rings. The number of rings may differ across operating systems. Typically, the most privileged ring is Ring 0 (in some operating systems this is referred to as "Root" access). As the ring number is increased, less privileges are available to software executing in a ring. The operating system kernel that controls I/O to hardware devices, including but not limited to the network interfaces and other device drivers, typically operates at Ring 0. An attacker that compromises a network interface (or other physical component of a computer system) would conceptually have complete and unrestricted access to everything on a machine, in part, because software executing in the network interface and the kernel typically executes at Ring 0. A compromised machine where executable commands are injected at Ring 0 may have no method of controlling access to sensitive data at Ring 0 or any higher ring levels. An application executing at a Ring typically has access to all information available at the current Ring and all higher level rings.

One method of compromising systems may be to have an entity intercept or monitor data transmission between an entity that is making a request and an entity that is responding to the request. An entity, in this context, may be but is not limited to an executing program, a remote system, or any hardware device installed in a computer system. The intercepted or monitored data may then be used to further aid in the compromise of a computer system (or a network of computer systems). The method of interception, for example, may be referred to as a "man in the middle" attack. In the man-in-the-middle attack scenario, the entity performing the interception appears to both the requesting entity and the responding entity to be a valid entity. The entity performing the interception (which may be referred to as simply "attacker") may perform any number of malicious operations that may include but not be limited to intercepting sensitive data, mutating the request to change how the responding entity operates, or mutating the response to manipulate how the requesting entity is reacts to the response.

When attempting to compromise a machine, an attacker may utilize the monitoring method to observe the implementation of various components in a computing system. A computing system in this context is used to refer any combination of computing resources that are working together to perform any particular function. The concept of a system may include but will not be limited to programs executing on multiple machines connected via network (e.g., a distributed application), multiple hardware devices communicating within the boundaries of a machine (e.g., internal communication over data channels such as a communication bus), or a combination of programs and hardware communicating through any communication medium. An attacker that has access to monitor how the components interact may be able to access sensitive data directly or, through monitoring and analysis, derive sensitive data. This type of attach may be known as a "side-channel" attack.

A variation of a technique to compromise a machine that combines aspects of both the man-in-the-middle and the side-channel attack methods, is referred to as a "spoofing" attack. In a spoofing attack, elements of a combination of methods are utilized to compromise a machine. An attacker utilizing a spoofing attack may utilize information gained through monitoring other entities to send falsified data to a requesting entity while the attacker masquerades as the responding entity. An example of such an attack is where an entity monitors timing between requesting entities and responding entities. In this type of attack, the attacking entity may masquerade as a responding entity (also referred to as impersonation) and respond to the requesting entity with falsified data. The attacking entity may perform this impersonation by taking advantage of the time taken for the responding entity to perform, for example, a computation based on data from the requesting entity. The attacking entity masquerading as the responding entity (e.g., impersonator), in this example, sends falsified data to the requesting entity faster than the appropriate responding entity.

Groups (e.g., IEEE) that dictate standards (e.g., 802.3) have introduced methods such as Internet Protocol Security (IPSec) and Media Access Control Security (MACSec) to, for example, actively identify entities participating in a network. These standards, if implemented by devices on the network, attempt to make it difficult for an unauthorized entity to compromise systems using attacking methods such as man-in-the-middle, side-channel, or any other devised method of attacking a system. The standards such as the examples of IPSec and MACSec attempt to prevent unauthorized devices from connecting to a network of other devices. A device that is unauthorized is therefore prevented from participating in the network and therefore has no capability to view or initiate communications with other devices in the network. Specifically, they may be blocked from obtaining network access and therefore are prevented from participating or receiving network traffic.

Machines that are actually connected to a network typically receive and send data via one or more network interfaces of that machine. The network interface in this context is a non-limiting concept that allows communication links to be made between computing hardware using a non-specific linking protocol or method. Despite methods that may be employed to prevent an unauthorized machine from participating in a network, data that has already been received by a network interface is typically no longer subject to heightened protections (e.g., because it is already believed to be verified and trusted). However, it is conceivable, for example, that attacks may originate from machines that are already authorized to participate in the network. Specifically, a machine internal to an organization and already connected to a corporate network may be compromised by physical intrusion of some sort. Also, data received by the network interface may be processed by one or more systems (e.g., hardware or software components) in the receiving machine and may have varying degrees of access internally within a given machine (e.g., computer system). For example, these internal systems that are processing the received data may be operating at the Ring 0 level. Further, a potential intruder may form data in such a way that it causes the receiving system to execute commands that aid in the compromising of the machine. That is, data may be provided through an authenticated channel and then, once on the system, the data itself may transform into executable instructions rather than simply being a data payload of a communication packet (e.g., a trojan horse). As mentioned above, commands executed at Ring 0 could potentially allow an attacker access to the entire machine, in part because, Ring 0 may have the least level of restriction for commands that can be executed on the machine. Thus, any data that can cause execution of a command at an execution level consistent with the processing system (e.g., network interface) may be able to introduce malicious code into a computer system.

Compromising a machine through data received by a network interface represents one possible example of how a machine may be compromised. As computing systems evolve, methods of attacking these systems also evolve. The methods and techniques used to attack a computer system continue to increase. Compromising a machine using physical attack techniques may be difficult to detect. Accordingly, in accordance with the examples of this disclosure, disclosed techniques may be used to detect an extraordinary case when an attacker may even have control over the hardware devices in the machine itself. This type of malicious access may include attempts to reconfigure existing devices or even change the configuration of the machine by adding or removing devices. Devices in the machine may additionally be reconfigured to masquerade as other devices for purposes of assisting in the compromising of the machine (or other machines).

This disclosure proposes, in part, techniques and systems to prevent and/or identify when a machine may have been compromised (or is currently under attack) by an attacker that may be using techniques involving spoofing, interception of data, mutation of data, or any other technique. These techniques may be used in combination with other techniques to detect computer system attacks (e.g., antivirus software, spyware detection, etc.). The techniques may utilize a method where connected hardware devices, typically initialized at machine startup, may be assigned security related data elements that may include specific types of tags, source and destination ids, and a series of encryption keys. The hardware devices may be connected via the machine's hardware bus or any other mechanism that a machine's architecture utilizes to allow hardware to interface with the machine (and other hardware components of that machine). Additional system hardware (or special configuration of existing hardware) that performs monitoring of the data requests and responses of hardware devices, in accordance with the techniques of this disclosure, may also be actively monitoring internal communications and data exchange within the machine. In one example implementation of this disclosure, already existing components of a machine (e.g., firmware or software) may be upgraded to perform all or parts of the disclosed tagging and monitoring techniques. Specifically, an existing processor may have additional software available (e.g., installed for on-demand processing or installed to run as a daemon process) to perform functions such as monitoring, tag generation, tag validation, process or communication destruction (i.e., in the case of possible attack), etc.

According to disclosed techniques, monitoring hardware, which again may be specialized additional hardware components, re-purposed existing components, or existing components with additional configuration, may detect requests generated from hardware that may be connected to the machine via one of the machine's hardware communication channels (e.g., a hardware bus). Before the machine delivers data related to the read request to the hardware that is intended to receive and handle the request, the monitoring hardware may intercept the transmission to manipulate the data such that the request and a corresponding response may be matched as part of a verification step. This verification step may take place when the response is generated to pair the response with and ensure a match to the request. The monitoring hardware may additionally note the source and destination identifiers for the request and may add this information to a monitoring queue that may be used later (at run-time or even as part of an audit or post attack diagnosis) to verify the response. The data added to the monitoring queue may further contain other metadata such as encryption algorithm, encryption algorithm settings, or the hashing algorithm that may be used to facilitate later verification of the response to the request. Specifically, disclosed example implementations may validate response request pairs at run-time, with a little additional computational overhead as possible, to allow secure communications internally to a machine. Additional data elements such as tags or other metadata to be used for later verification of the response may be added to the request data. The data for the request and additional elements may then be encrypted using an encryption key from the list of encryption keys assigned to the hardware during the machine's initialization. The monitoring system may verify that the encryption key is not currently used by another active request to ensure, for example, that requests originated from other devices will not be able to use the same encryption key. The encrypted request may then be delivered to the destination hardware.

In an alternate implementation, validation may actually take place without deferring delivery of the response. That is, the response may be delivered back to the requestor for that process/device to start processing and in parallel the validation may take place (e.g., asynchronously to the response being provided). This type of implementation may therefore not affect existing system throughput and still provide security because the validation should take place concurrently with the requestor initiating processing of the response, and if there is a validation error, the processing may be forcibly interrupted by the disclosed monitoring system. Accordingly, some implementations, upon validation error, may take significant actions up to and including shutting down the computer system in its entirety. Clearly, lesser actions, such as shutting down specific components, processes, or devices may also be implemented.

The monitoring hardware may detect responses and intercept the responses before (or after) they are delivered to the intended destination. The data in the response may be evaluated and matched with a request that was previously noted (e.g., a request/response pair). The metadata stored with the previously noted request may be used to decrypt the response and validate that the request and response tags match their intended value (e.g., an encrypted validation). If the request and response tags match, the response may be delivered to the hardware that originally made a request corresponding to the response. In this manner, data transmissions internal to a machine may be verified to improve the functioning of the computer system itself and to increase overall security of an enterprise and its computer systems. Thus, a machine may have validated and secure internal communication between components (both hardware and software) of the device. In some implementations, encryption of data on a bus is not required (and an encryption process may be elided to conserve processing resources) at all to make a device secure. The disclosed matching of request/response pairs may enable an implementation of a highly secure machine without encrypting actual communication data.

Mismatched request and response tags or responses with no matching request may indicate that the response is not a valid communication. Identification of mismatching tags may, for example, cause monitoring hardware to trigger a system alarm or event. This system alarm/event may be intercepted by higher level operating system features or software. Handling this alarm interception may allow either the operating system or third-party software to perform actions such as, for example, terminating the process that was involved in generating the mismatched request and/or response. The action to be taken may be configurable such that a threat level is assessed differently between various request/response pairs and different actions may be taken while handling the system alarm.

In some implementations, the request/responder encrypted key comparison logic function (e.g., response mode activity bus monitor) may send an interrupt, and a message indicating a security violation has been detected to the system console/manager device. This message may then be used to generate a log of the event in the systems history records. Also, the message or information associated or derived from the message may be used to inform the receive target device that the data from the response cycle is not to be used and may further cause the system to indicate that data from the response cycle is to be poisoned (marked as inappropriate data). Upon detection of an incorrect encrypted key-code for the response cycle, the response mode activity bus monitor may in addition terminate the response cycle, preventing the cycle from completing the communication transfer.

There are different techniques that may be used to generate/maintain unique keys for each transaction (e.g., data transfer or command transfer). For example, during transmission of request(s), a secure sequencing key may be passed to the responder, such that when the responder (process or device) has created the data for response, the responder can provide the correct response paired code (tag) along with the response. This may allow the response and its paired code to be examined to validate the authority of the responder and prove that its data is secure. In one example implementation this may be done by matching the response code to an expected value. The requester/responder key code sequence may be unique for each transfer, such that the sequence tag/id prevents re-use of a matching pair. This type of uniqueness within an implementation may prevent pairs from being re-used in a "replay" mechanism attack.

Keys may also be protected within a system implemented in accordance with this disclosure. For example, keys may be initially generated, based on random number seeds, with logical functionality integrated into the security bus monitor-watcher device logic. The random, non-repetitive key code generation and response sequence may also be uniquely paired, per endpoint device, and per boot/re-boot cycle. As such, the origination of the keys requires no source code generation traceability to the endpoint devices, but still enables them to be unique, and non-deterministic in their sequencing.

As briefly mentioned above, techniques may be implemented to secure a device even without having to encrypt actual data transmissions (or command requests). In some cases, this type of implementation may present a further improvement over implementations that encrypt internal data bus interconnects. That is, a technique that has secure tagged request/response pairs may insure security against manipulation using less processing overhead than encrypting the information. Specifically, a paired request/response mechanism may save overall performance resources (e.g., silicon area cost) on a computer system while still being integrated into all computer subsystem devices that pass messages. Disclosed techniques may use hardware based encrypted keys (e.g., as the tags for request/response pairs). These types of implementations that use hardware based encrypted keys may represent implementations that may be both faster, and cheaper in computer devices than techniques that encrypt the hardware data bus completely.

As mentioned above, data communications that may be organized and tracked may take place using an internal communication bus of a computer system. There are different types of hardware communication busses that may be internal to a computer system and a physical bus may be divided into logical components (or portions) to handle different types of communication. In one example, a hardware communication bus may have multiple channels of communication (e.g., a 6-bit bus might have 6 channels (or less) of communication whereas a 64-bit bus may have as many as 64 different channels of communication). Sometimes a bus may be subdivided in such a way that multiple bits of communication are dedicated to different types of communication. As an example, an 8-bit bus may use two bits for control signals (e.g., a control bus), two bits to exchange addressing information (e.g., an address bus), and four bits to exchange data (e.g., a data bus). Of course, these examples are not intended to be limiting and a bus may be logically divided into different portions of varying amounts of the available communication channels (e.g., bandwidth) segregated into any number logical subdivisions.

There are also different types of communication protocols that may utilize different types of busses. Example bus types include but are not limited to, small computer system interface (SCSI), serial attached SCSI (SAS), peripheral component interconnect (PCI), Peripheral component interconnect express (PCI Express), system management bus (SMB), inter-integrated circuit (I2C), controller area network (CAN bus), and numerous others. Disclosed techniques may work with these and other types of busses to ensure that response/request pairs are properly authenticated and expected between different components of a computer system (or network attached devices).

Having an understanding of the above overview, this disclosure will now explain a non-limiting but detailed example implementation. This example implementation is explained with reference to the figures and includes: an example of hardware sub-systems that facilitate securely delivering and validating requests and responses (FIGS. 1-2); an example hardware sub-system interaction diagram (FIG. 3); an example functional process flow for securing a request (FIG. 4); is an example computing device with a hardware processor and accessible machine-readable instructions that might be used for performing the process for securing a request (FIG. 5); an example process for receiving and validating a response (FIG. 6); an example computing device with a hardware processor and accessible machine-readable instructions that might be used for performing the process for receiving and validating a response (FIG. 7); a computer network infrastructure that may be used to implement all or part of the disclosed secure request and response delivery techniques, according to one or more disclosed implementations (FIG. 8); an example computer processing device that may be used to implement the functions, modules, processing platforms, execution platforms, communication devices, and other methods and processes of this disclosure (FIG. 9).

Referring now to FIG. 1, block diagram 100 illustrates system components that may facilitate securely delivering a request 140 initiated by a requesting hardware device 120 internally to a computer 110. In example block diagram 100, hardware devices internal to computer 110 may communicate with each other over the hardware connection bus 160. Monitoring hardware 130 detects when a request 140 is made by a requesting hardware device 120 and intercepts the delivery by routing the request 140 to the monitoring hardware 130. Monitoring hardware 130, in this example, assigns tags and encryption keys that may be associated with the request 140 and notes these in the internal storage 170. The monitoring hardware 130 may then combine tags and any other additional metadata along with the request data 140 to form an encrypted and/or traceable request 150. The monitoring hardware 130 may then deliver the request 150 to the originally intended destination through the hardware connection bus 160. Thus, a request may be augmented (e.g., both internally and externally) with embedded control information and external tracking information (and may possibly be encrypted) to facilitate later validation of a response to a request (e.g., a request/response pair matching and validation), according to one or more disclosed implementations.

As mentioned above, monitoring hardware 130 may be implemented in a number of ways without departing from the scope of this disclosure. In one example monitoring hardware may represent an existing processor of a computer system (e.g., see hardware processor 501 in FIG. 5 or processor 905 of FIG. 9) that executes a software module to implement the disclosed monitoring functions. In another example, an additional processor (and possibly firmware) may be added to a computer system to be dedicated to performing the disclosed monitoring function. In implementations that utilize an additional processor, throughput of the original components of a computer system may be unaffected by the overhead of disclosed monitoring, tagging, and validation techniques. For example, they may be executed in parallel with the previously existing processors performing their intended functions. In some implementations, the existing processors may not be aware of the monitoring functions until such time as an alert is issued. This type of isolation may enhance the ability of the computer system to avoid a spoofing attack or attacks where a rouge process (e.g., malicious software) executing on a processor attempts to hide itself from monitoring that takes place on the same processor that it has already infected.

Alerts from a monitoring function executing on an existing processor (or specifically dedicated hardware) may be initiated and transmitted in a number of ways. In some cases, alerts may be implemented as a hardware interrupt to send a signal to another processor to indicate a possible breach (or warning). In other implementations, alerts may be implemented as signals or data packets sent between processors via a data bus. To alert systems external to the computer system that a possible breach has occurred, alerts may also include a network transmission to an external system or enterprise management system designed to interface and provide security and system administration messages to system administrators. Thus, upon detection of a possible breach of one system, a system administrator (or other responsible party), possibly at a remote location, may be notified of a potential concern identified by the monitoring function. Other alert mechanisms are also possible.

Figure 2:
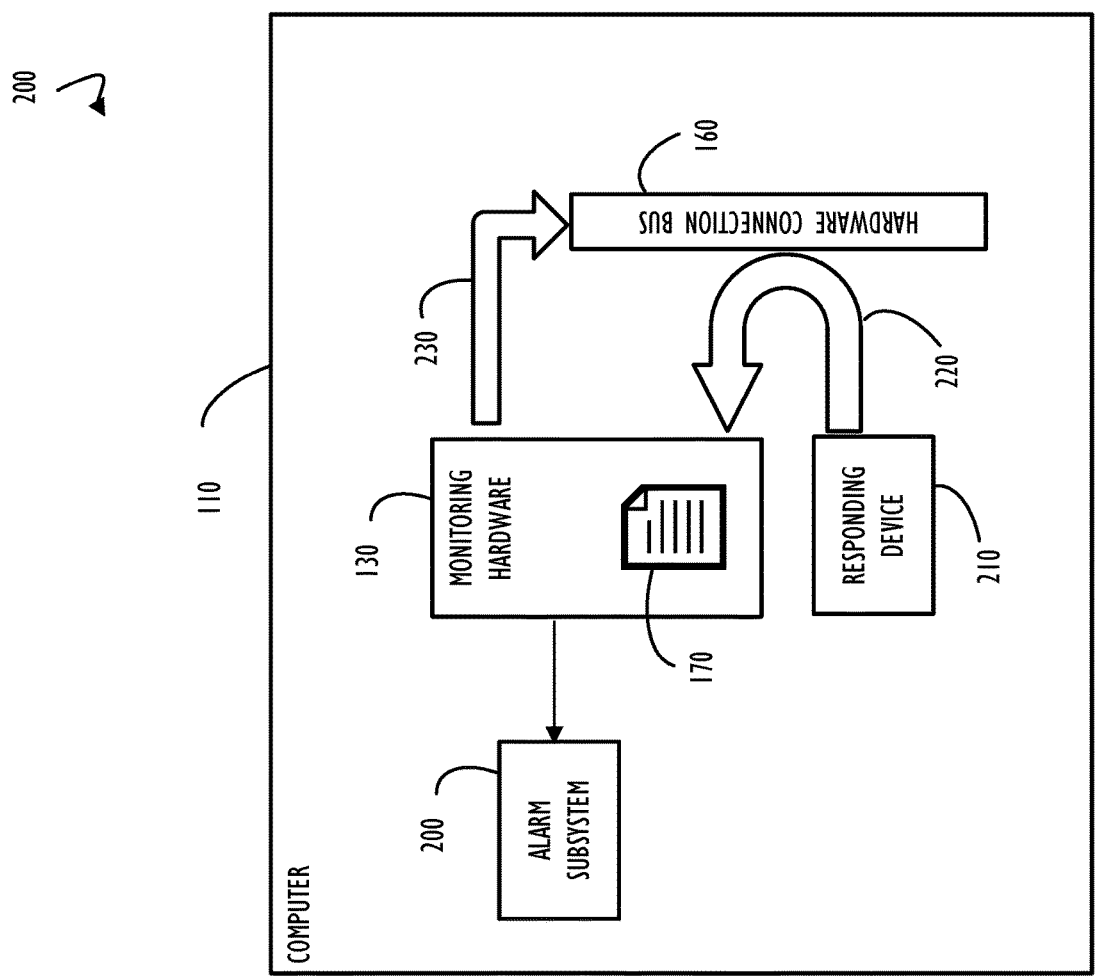
FIG. 2 is a functional block diagram representing an example of a hardware sub-system that facilitates validating a response, according to one or more disclosed implementations.

Referring now to FIG. 2, the block diagram 200 illustrates example system components that may assist in validating a response 220 to a previously handled request received by a responding hardware device 210 internally to a computer 110. The encrypted response 220 (that may be composed of a payload containing tags, metadata, and encrypted response data) is, in this example implementation, intercepted by monitoring hardware 130. The encrypted response 220 may be delivered to monitoring hardware 130 via the hardware connection bus 160. The monitoring hardware 130 may validate the response and match the specific response to a specific request that may be tracked in internal storage 170. If the monitoring hardware 130 validates that the encrypted response 220 properly matches a known request through validation against tracked requests stored in internal storage 170, the response 230 is delivered to the matched requesting hardware via the hardware connection bus 160. If the monitoring hardware 130 is unable to validate the encrypted response 220 (e.g., no match is found) to a request through validation against tracked requests stored in internal storage 170, the monitoring hardware 130 may activate alarm subsystem 200 and discard the encrypted response 220. In addition to the monitoring hardware 130 activating the alarm subsystem 200, the monitoring hardware may take additional steps to ensure the invalid response 220 is never delivered to the intended recipient hardware and/or that processes are terminated, or device components are disabled.

In some implementations, communications may be between a component, such as a motherboard and a fan, power supply, or other non-traditional computing component of a computer system (not separately illustrated in FIG. 1 or 2). Clearly, an attacker may cause adverse conditions on a computer system if they were able to send control commands to components of the system that are not considered traditional computing components (e.g., cooling mechanisms, power sources, environmental sensors, etc.). As used in this context, traditional computing components refers to components that provide compute resources as opposed to components that are traditionally present in computer systems but do not perform computations. In some implementations, security over both compute components and non-compute components may be desired. Thus, a control command may also be monitored and paired with an identifier to ensure that the control command is valid and may be acted upon by the component receiving the control command. Accordingly, a command to tell a fan subsystem to change speeds (or turn off) may be secured to prevent malicious activity with these types of components within a secured computer environment.

Figure 3:
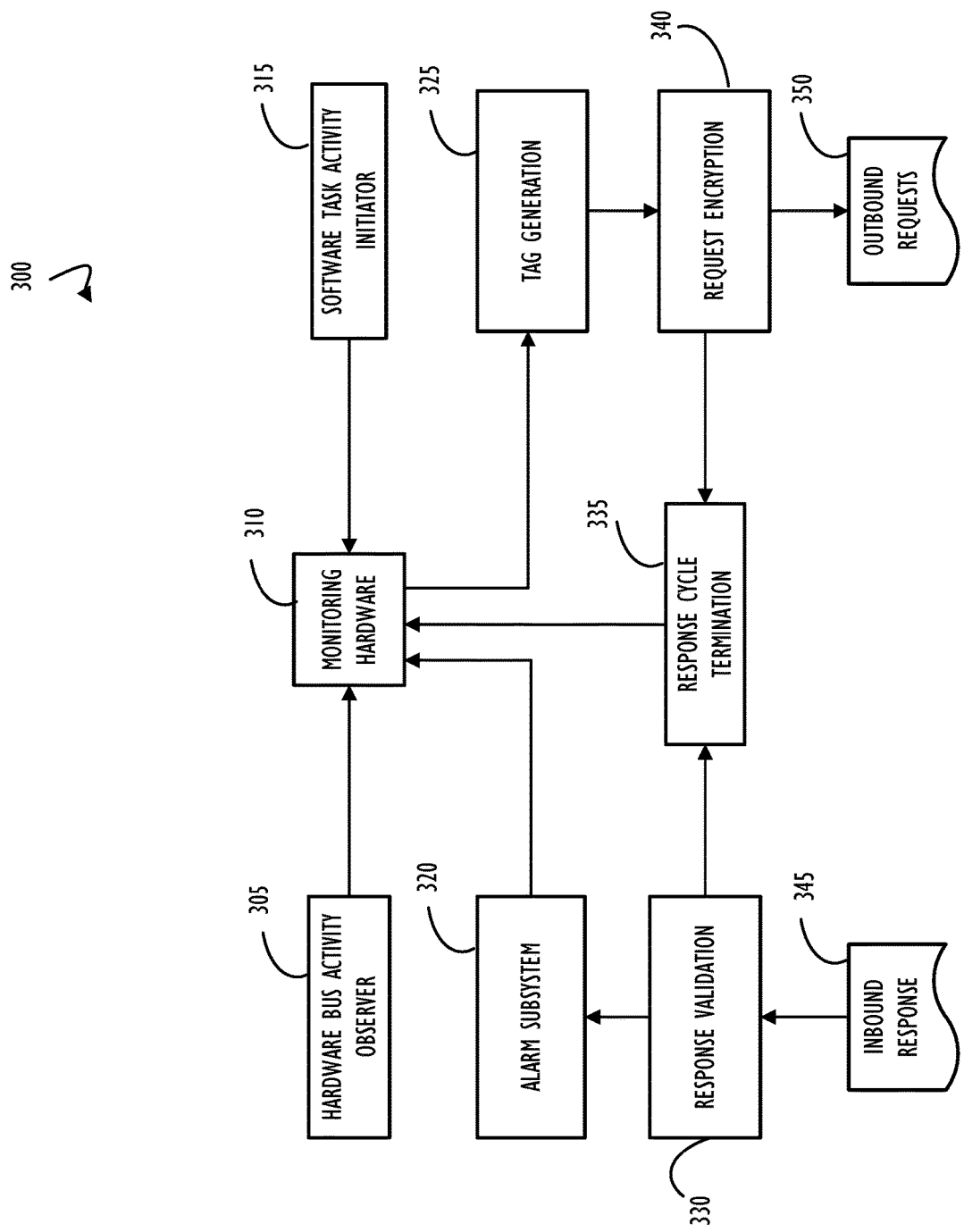
FIG. 3 is a block diagram representing an example hardware sub-system interaction diagram, according to one or more disclosed implementations.

Referring now to FIG. 3, the sub-system interaction diagram 300 shows one example of hardware sub-systems that may be utilized to implement the measures described in this disclosure in accordance with the examples. Configuration of security and orchestration controlled by monitoring hardware 310 may be performed by software tasks initiated in the software task activity initiation sub-system 315. The hardware bus activity observer 305 may observe requests initiated on the hardware bus and may transfer request data to monitoring hardware 310. Monitoring hardware 310 may orchestrate the transfer of request data and any additional required metadata to the tag generation sub-system 325. The tag generation sub-system 325 may transfer the request data, additional required metadata, and assigned tag data to the request encryption sub-system 340. The request encryption sub-system 340 may then transfer the encrypted outbound request 350 to the hardware bus to be delivered to the intended destination. Any validation failures detected as part of the operation of the request encryption sub-system 340 may result in a notification to the response cycle termination sub-system 335 to prevent the delivery of request data. The response cycle termination sub-system 335 may send notification of the termination of the request to the monitoring hardware 310.

An inbound response 345 may be delivered to the response validation sub-system 330 via a hardware bus, for example. If the validation of the response fails, the response validation sub-system 330 may send a notification to the response cycle termination sub-system 335 to prevent the delivery of response data. The response cycle termination sub-system 335 may also send notification of the termination of the response to the monitoring hardware 310. A validation failure of the response by the response validation sub-system 330 may result in a notification to the alarm sub-system 320 which may send notification to the monitoring hardware 310. Further termination or disabling of processes or components, respectively, may be invoked if implemented based on security design requirements.

Implementations of this disclosure may allow for testing and debugging of otherwise secure devices, in part, because at development time and within a controlled development/test environment, debug/test hooks may be provided within either (or both of) the hardware bus activity observer 205 and monitoring hardware 310 to allow visibility into an otherwise completely encrypted system. Of course, implementation of these types of debug/test hooks must be made with care to not present a point of future vulnerability for a secure system. That is, the debug/test hooks should be implemented in such a manner that they may only be invoked while in a controlled debug/test environment. Different techniques may be used to implement this type of security to include the debug/test hooks and may include use of a physical hardware dongle connected to the device to enable debug/test activities. Other techniques to securely control debug/test hooks (e.g., using software licensing techniques) are also possible, the details of which are beyond the scope of this disclosure.

Figure 4:
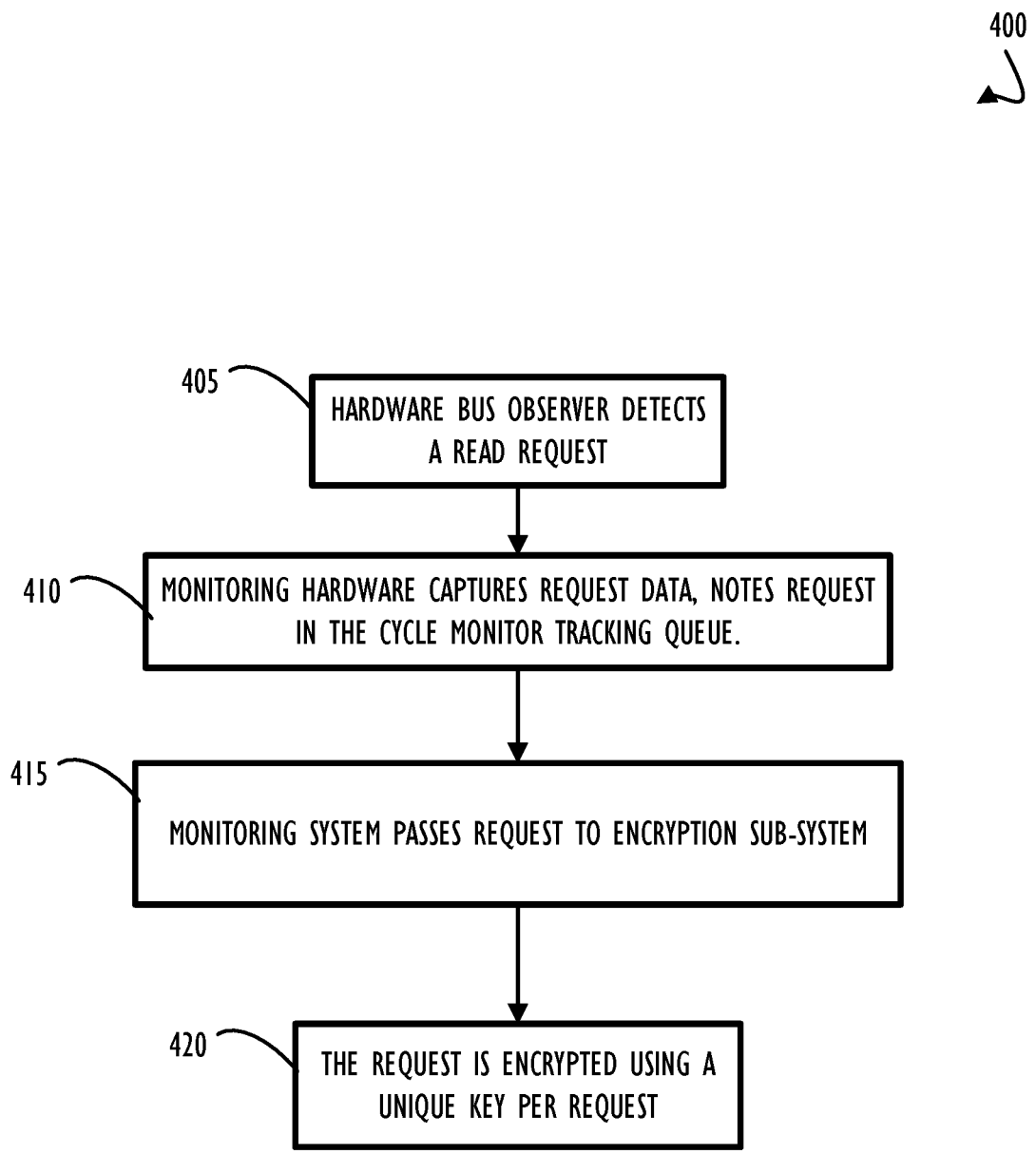
FIG. 4 is a flow diagram depicting one example process for securing a request, according to one or more disclosed implementations.

Referring now to FIG. 4, there is shown a flow diagram depicting one example process 400 for securing a request. Process 400 begins in block 405 where a request is detected by the external bus observer for that may be delivered to a downstream device. Example process 400 continues to block 410 where the monitoring hardware may capture data such as address, length, and ID of the request and noting the parameters in the cycle monitor tracking queue. The request may then be passed to block 415 where request data is combined with data that may be required for tracking and validation. Process 400 continues with block 420 where the combined data may then be encrypted utilizing a unique key for the request. In this manner, each request may be associated with control information to be utilized with a response to this request and validate integrity of the response.

Figure 5:
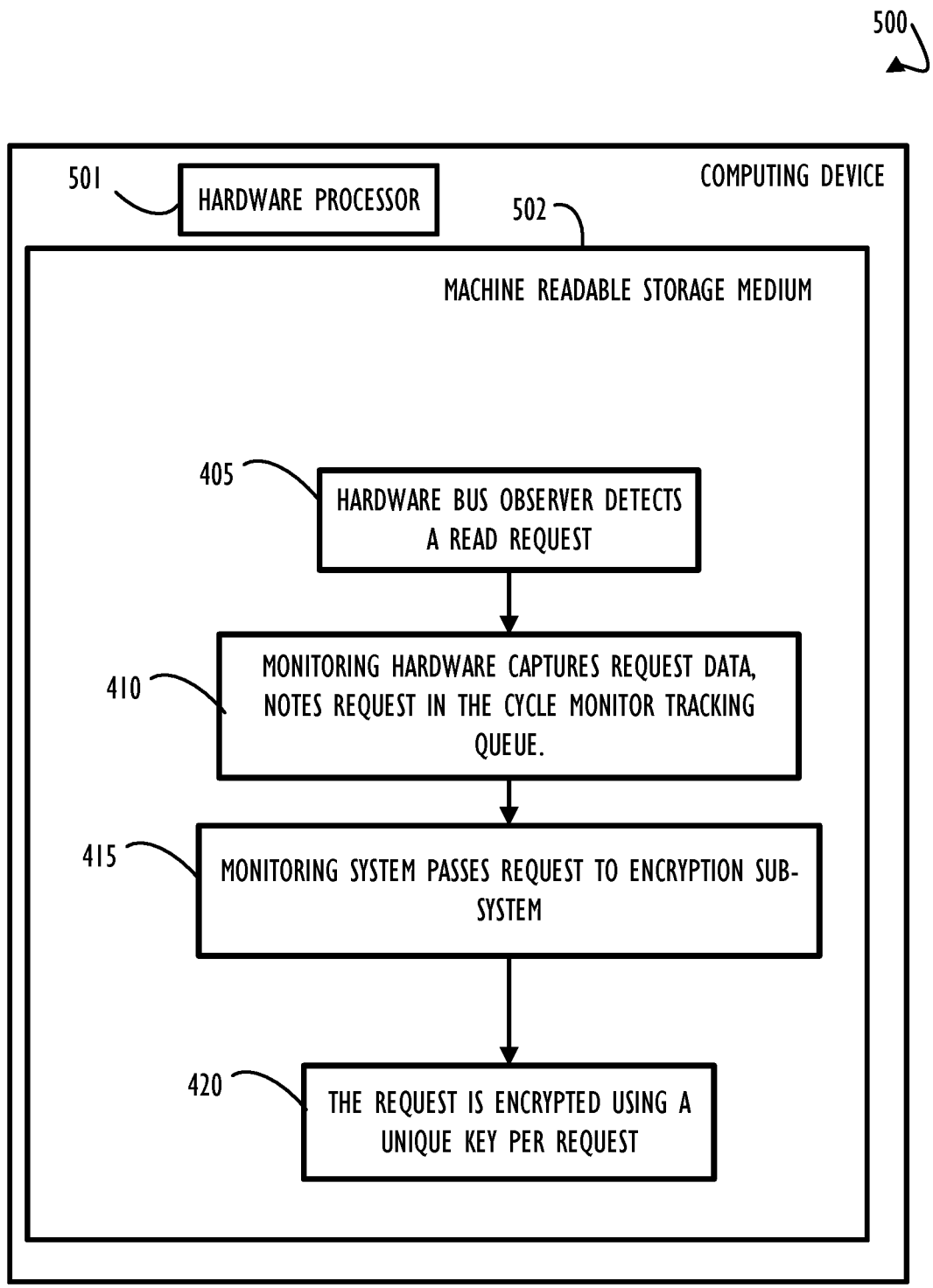
FIG. 5 is an example computing device with a hardware processor and accessible machine-readable instructions that might be used for performing the process for securing a request, according to one or more disclosed implementations.

FIG. 5 is an example computing device 500, with a hardware processor 501, and accessible machine-readable instructions stored on a machine-readable medium 502 for performing the process of securing a request, according to one or more disclosed example implementations. FIG. 5 illustrates computing device 500 configured to perform the flow of process 400 as an example. However, computing device 500 may also be configured to perform the flow of other methods, techniques, functions, or processes described in this disclosure. In this example of FIG. 5, machine-readable storage medium 502 includes instructions to cause hardware processor 501 to perform blocks 405-420 discussed above with reference to FIG. 4.

A machine-readable storage medium, such as 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 6:
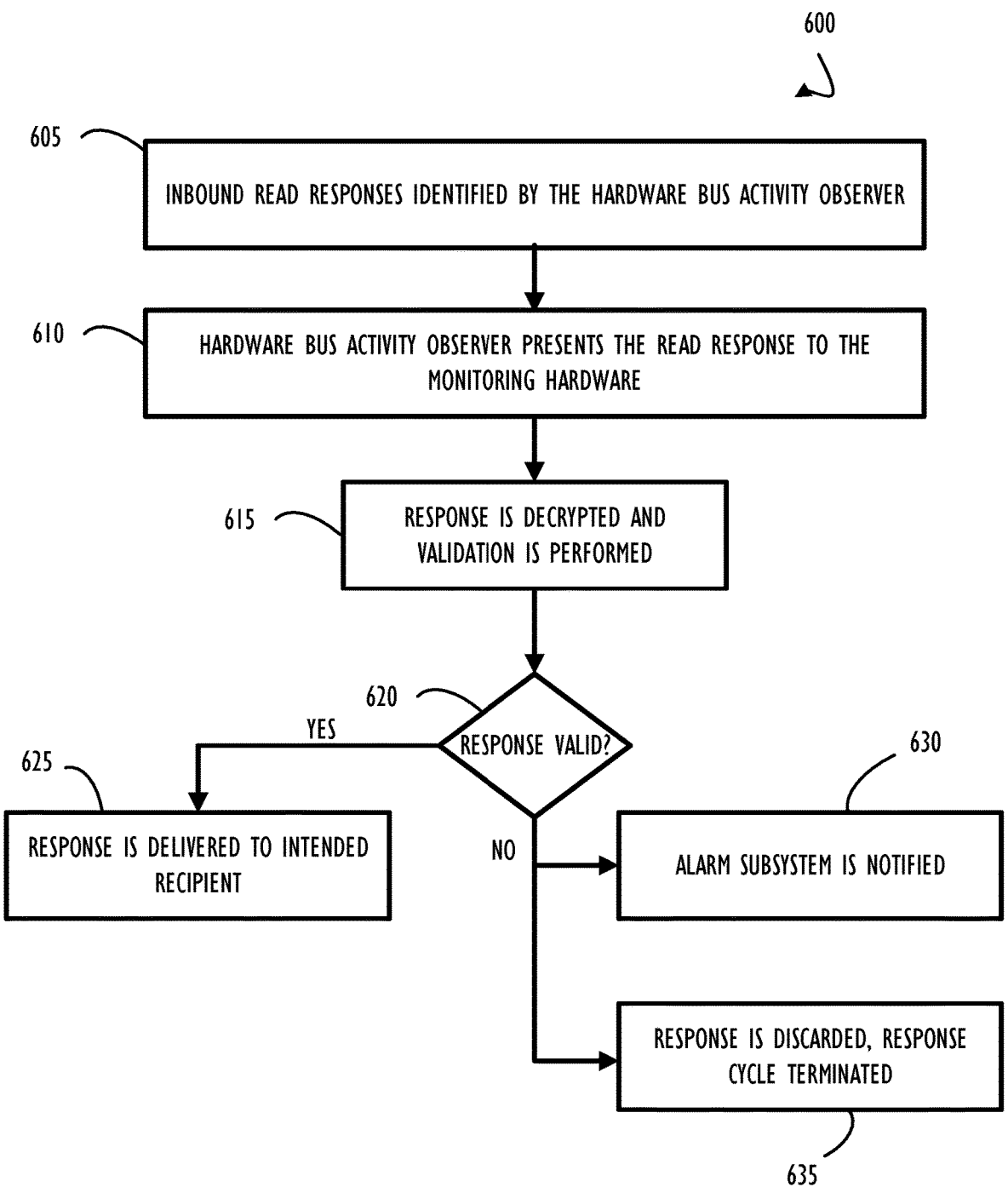
FIG. 6 is a flow diagram depicting one example process for receiving and validating a response, according to one or more disclosed implementations.

Referring now to FIG. 6, there is shown a flow diagram depicting one example process 600 for receiving and validating a response. Example process 600 begins at block 605 where the hardware bus monitor identifies a read response. Continuing to block 610, the monitoring hardware, in this example, is notified and prepared for the response validation activity. The response is decrypted (if required) and the validation is performed in block 615. Block 620 indicates that a decision is made about the validation of the response. If the validation was successful, the response is delivered to the intended recipient in accordance with block 625. If the validation was not successful, the alarm system is notified in accordance with block 630 and the response is discarded in accordance with block 635. Further, either the requesting process/device and/or responding process/device may be terminated or disabled as required by security design criteria.

Figure 7:
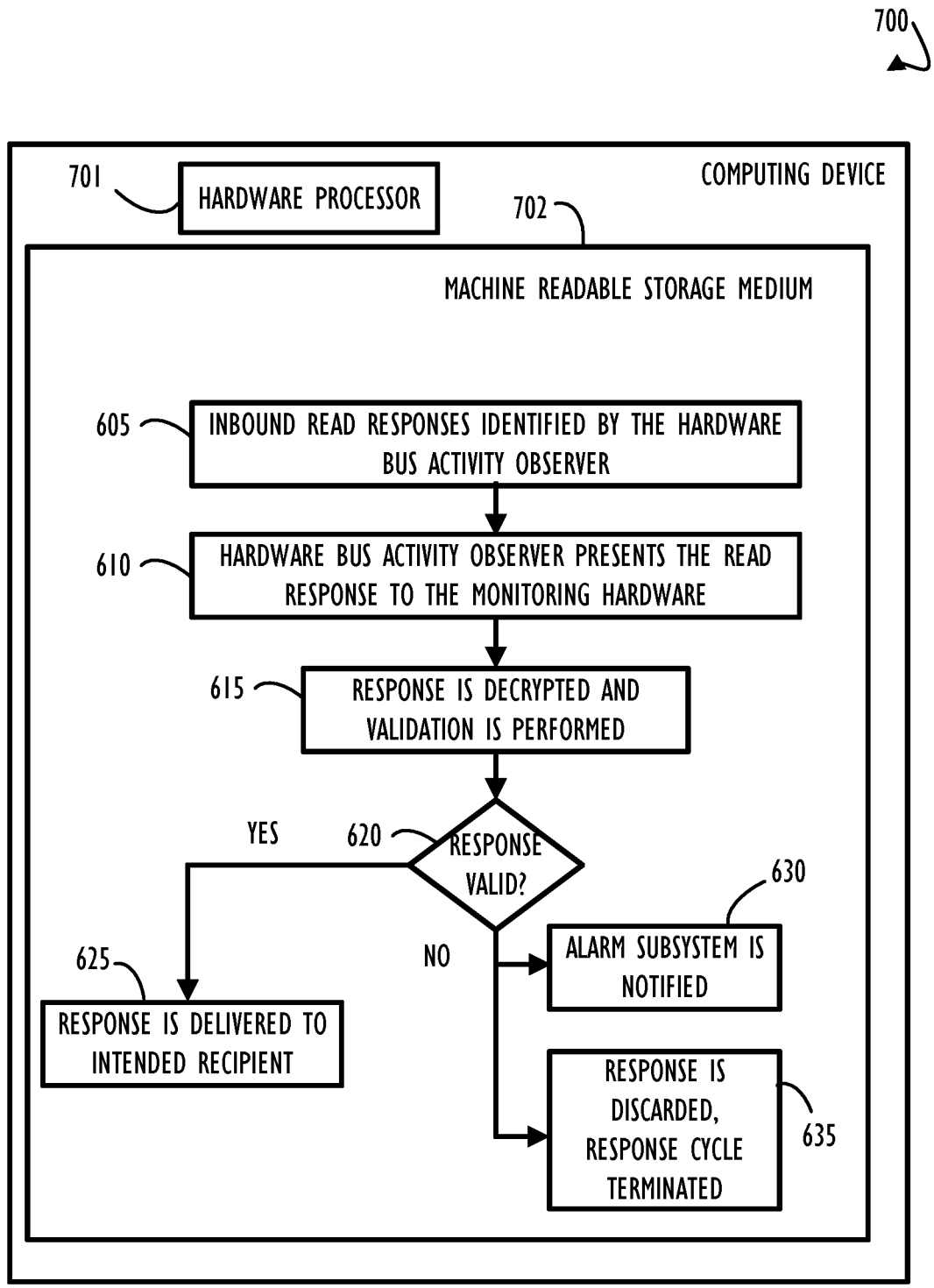
FIG. 7 is an example computing device with a hardware processor and accessible machine-readable instructions that might be used for performing the process for receiving and validating a response, according to one or more disclosed implementations.

FIG. 7 is an example computing device 700, with a hardware processor 701, and accessible machine-readable instructions stored on a machine-readable medium 702 for performing the process of receiving and validating a response, according to one or more disclosed example implementations. FIG. 7 illustrates computing device 700 configured to perform the flow of process 600 as an example. However, computing device 700 may also be configured to perform the flow of other methods, techniques, functions, or processes described in this disclosure. In this example of FIG. 7, machine-readable storage medium 702 includes instructions to cause hardware processor 701 to perform blocks 605-635 discussed above with reference to FIG. 6.

A machine-readable storage medium, such as 702 of FIG. 7, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 8:
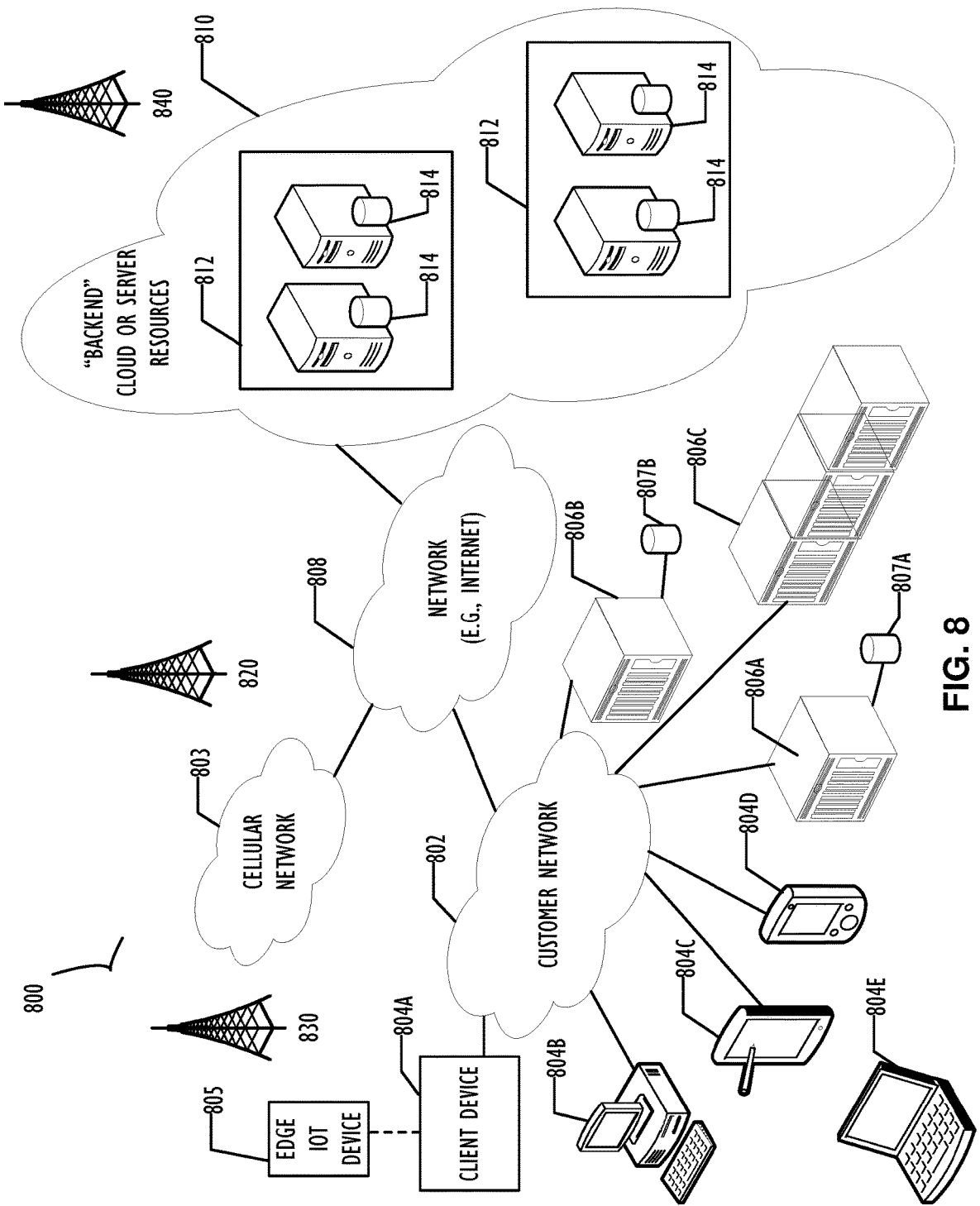
FIG. 8 represents a computer network infrastructure that may be used to implement all or part of the disclosed secure request and response delivery techniques, according to one or more disclosed implementations.
Figure 9:
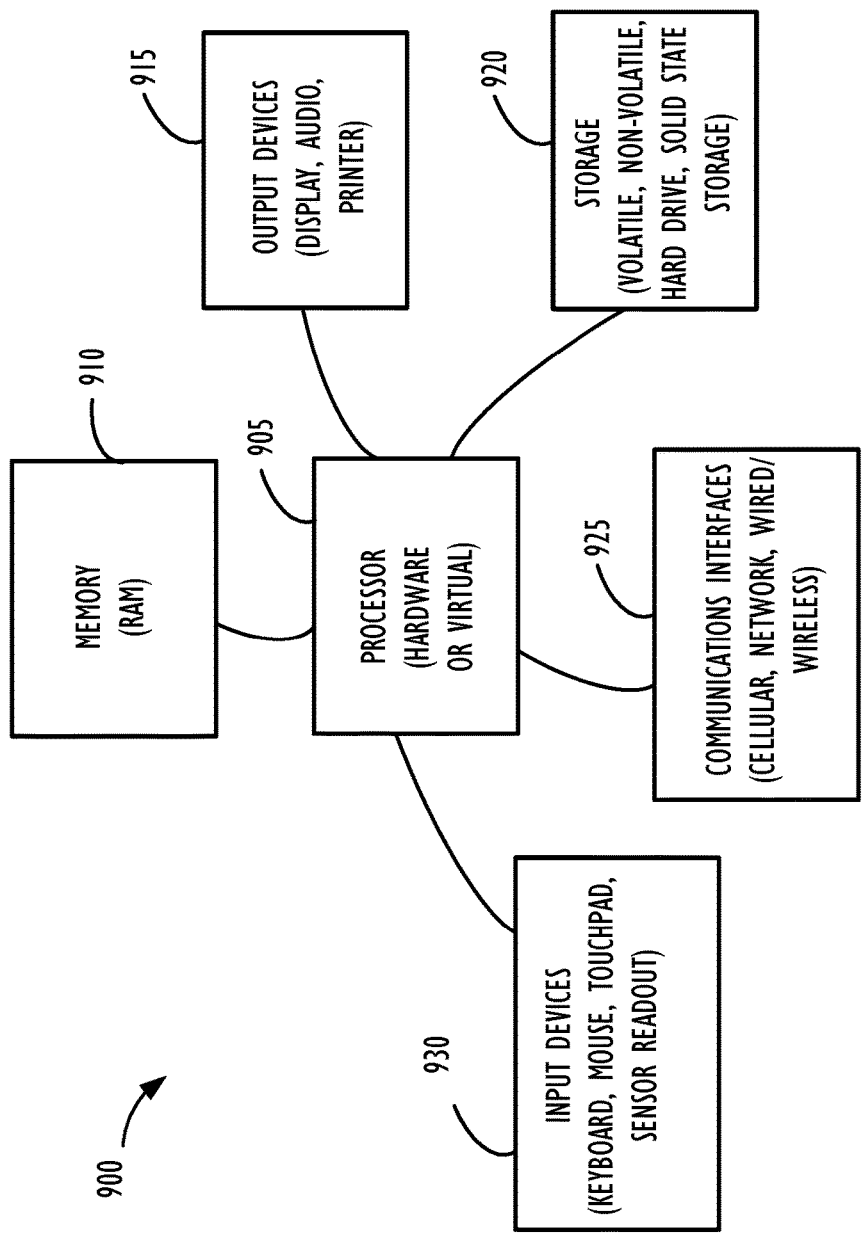
FIG. 9 illustrates a computer processing device that may be used to implement the functions, modules, processing platforms, execution platforms, communication devices, and other methods and processes of this disclosure.

FIG. 8 represents a computer network infrastructure that may be used to implement all or part of the disclosed secure request and response delivery techniques, according to one or more disclosed implementations. Network infrastructure 800 includes a set of networks where embodiments of the present disclosure may operate. Network infrastructure 800 comprises a customer network 802, network 808, cellular network 803, and a cloud service provider network 810. In one embodiment, the customer network 802 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 802 represents an enterprise network that could include or be communicatively coupled to one or more local area networks (LANs), virtual networks, data centers and/or other remote networks (e.g., 808, 810). In the context of the present disclosure, customer network 802 may include multiple devices configured with the disclosed secure request and response delivery techniques such as those described above. Also, one of the many computer storage resources in customer network 802 (or other networks shown) may be configured to store the historical any historical data related to response validation failures for future security auditing purposes.

As shown in FIG. 8, customer network 802 may be connected to one or more client devices 804A-E and allow the client devices 804A-E to communicate with each other and/or with cloud service provider network 810, via network 808 (e.g., Internet). Client devices 804A-E may be computing systems such as desktop computer 804B, tablet computer 804C, mobile phone 804D, laptop computer (shown as wireless) 804E, and/or other types of computing systems generically shown as client device 804A.

Network infrastructure 800 may also include other types of devices generally referred to as Internet of Things (IoT) (e.g., edge IOT device 805) that may be configured to send and receive information via a network to access cloud computing services or interact with a remote web browser application (e.g., to receive configuration information).

FIG. 8 also illustrates that customer network 802 includes local compute resources 806A-C that may include a server, access point, router, or other device configured to provide for local computational resources and/or facilitate communication amongst networks and devices. For example, local compute resources 806A-C may be one or more physical local hardware devices with different configurations of the hardware systems outlined in the examples. Local compute resources 806A-C may also facilitate communication between other external applications, data sources (e.g., 807A and 807B), and services, and customer network 802. Local compute resource 806C illustrates a possible processing system cluster with three nodes. Of course, any number of nodes is possible, but three are shown in this example for illustrative purposes.

Network infrastructure 800 also includes cellular network 803 for use with mobile communication devices. Mobile cellular networks support mobile phones and many other types of mobile devices such as laptops etc. Mobile devices in network infrastructure 800 are illustrated as mobile phone 804D, laptop computer 804E, and tablet computer 804C. A mobile device such as mobile phone 804D may interact with one or more mobile provider networks as the mobile device moves, typically interacting with a plurality of mobile network towers 820, 830, and 840 for connecting to the cellular network 803. In the context of the current use of the alarm subsystem, software that is activated in response to an alarm may be used to provide an end-user notification. In some implementations, this notification may be provided through network infrastructure 800 directly to a system administrators cellular phone.

Although referred to as a cellular network in FIG. 8, a mobile device may interact with towers of more than one provider network, as well as with multiple non-cellular devices such as wireless access points and routers (e.g., local compute resources 806A-C). In addition, the mobile devices may interact with other mobile devices or with non-mobile devices such as desktop computer 804B and various types of client device 804A for desired services. Although not specifically illustrated in FIG. 8, customer network 802 may also include a dedicated network device (e.g., gateway or router) or a combination of network devices (not shown) that implement a customer firewall or intrusion protection system. These types of devices may be configured to provide an interface to a secure request and response delivery system of this disclosure.

FIG. 8 illustrates that customer network 802 is coupled to a network 808. Network 808 may include one or more computing networks available today, such as other LANs, wide area networks (WAN), the Internet, and/or other remote networks, in order to transfer data between client devices 804A-D and cloud service provider network 810. Each of the computing networks within network 808 may contain wired and/or wireless programmable devices that operate in the electrical and/or optical domain.

In FIG. 8, cloud service provider network 810 is illustrated as a remote network (e.g., a cloud network) that is able to communicate with client devices 804A-E via customer network 802 and network 808. The cloud service provider network 810 acts as a platform that provides additional computing resources to the client devices 804A-E and/or customer network 802. In one embodiment, cloud service provider network 810 includes one or more data centers 812 with one or more server instances 814.

FIG. 9 illustrates a computer processing device 900 that may be used to implement the functions, modules, processing platforms, execution platforms, communication devices, and other methods and processes of this disclosure. For example, computing device 900 illustrated in FIG. 9 could represent a client device or a physical server device and include either hardware or virtual processor(s) depending on the level of abstraction of the computing device. In some instances (without abstraction), computing device 900 and its elements, as shown in FIG. 9, each relate to physical hardware. Alternatively, in some instances one, more, or all of the elements could be implemented using emulators or virtual machines as levels of abstraction. In any case, no matter how many levels of abstraction away from the physical hardware, computing device 900 at its lowest level may be implemented on physical hardware.

As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display).

Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 9, computing device 900 includes a processing element such as processor 905 that contains one or more hardware processors, where each hardware processor may have a single or multiple processor core. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 9, the processing elements that make up processor 905 may also include one or more of other types of hardware processing components, such as graphics processing units (GPU), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more storage devices 920 that comprise a non-volatile storage device and/or volatile memory. Volatile memory, such as random-access memory (RAM), can be any suitable non-permanent storage device. The non-volatile storage devices 920 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage device 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touch pad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 900 may comprise other components well known in the art, such as sensors, powers sources, and/or analog-to-digital converters, not explicitly shown in FIG. 9.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of validating internal communication on a computer device, the method comprising:
   intercepting a data transmission request from a first entity of the computer device to communicate with a second entity of the computer device via an internal communication bus of the computer device;
   responsive to the interception, augmenting the data transmission request with a unique identifier to individually identify the data transmission request and providing the data transmission request to the second entity;
   identifying a response to the data transmission request from the second entity to the first entity; and
   allowing access to the response, by the first entity, based, in part, on a validation of the response based on an association of the response to the unique identifier.

2. The method of claim 1, wherein the data transmission request represents a control command to a non-compute resource of the computer device.

3. The method of claim 2, wherein the non-compute resource of the computer device is at least one of a power supply, a fan, an environmental control component, or a sensor.

4. The method of claim 1, wherein the first entity is a process executing on a hardware processor of the computer device and the second entity is a device component of the computer device.

5. The method of claim 4, wherein the process executing on the hardware processor is interfacing with the device component of the computer device using a device driver.

6. The method of claim 5, wherein the device driver executes at a highest privilege level of an operating system controlling the computer device.

7. The method of claim 1, further comprising:
   responsive to a failed validation of the response, preventing access of the first entity to the response.

8. The method of claim 7, further comprising:
   responsive to the failed validation of the response, terminating a process associated with processing the response.

9. The method of claim 7, further comprising:
   responsive to the failed validation of the response, disabling a component of the computer device associated with providing the response.

10. The method of claim 7, further comprising:
    responsive to the failed validation of the response, generating an alert to provide an indication of the failed validation.

11. The method of claim 1, wherein the unique identifier comprises a uniquely generated tag associated with a request/response pair.

12. The method of claim 11, wherein at least a portion of the information in the request and the response is secured by the tag associated with the request/response pair to elide encryption of that portion of the information.

13. A computer device, comprising:
a first hardware processor;
one or more data areas accessible to the first hardware processor, the data areas for storing information associated with a request/response exchange between a first entity of the computer device and a second entity of the computer device; and
an instruction memory area communicatively coupled to the first hardware processor, wherein the instruction memory area stores instructions, that when executed by the first hardware processor, cause the first hardware processor to:
  intercept a data transmission request from the first entity of the computer device to the second entity of the computer device via an internal communication bus of the computer device;
  responsive to the interception, augment the data transmission request with a unique identifier to individually identify the data transmission request and provide the data transmission request to the second entity;
  identify a response to the data transmission request from the second entity to the first entity; and
  allow access to the response, by the first entity, based, in part, on a validation of the response based on an association of the response to the unique identifier.

14. The computer device of claim 13, wherein the data transmission request represents a control command to a non-compute resource of the computer device.

15. The computer device of claim 14, wherein the non-compute resource of the computer device is at least one of a power supply, a fan, an environmental control component, or a sensor.

16. The computer device of claim 13, wherein the first entity is a process executing on a hardware processor of the computer device and the second entity is a device component of the computer device.

17. A non-transitory computer readable medium comprising computer executable instructions stored thereon that when executed by one or more hardware processors, cause the one or more hardware processors to:
  intercept a data transmission request from a first entity of the computer device to a second entity of the computer device via an internal communication bus of the computer device;
  responsive to the interception, augment the data transmission request with a unique identifier to individually identify the data transmission request and provide the data transmission request to the second entity;
  identify a response to the data transmission request from the second entity to the first entity; and
  allow access to the response, by the first entity, based, in part, on a validation of the response based on an association of the response to the unique identifier.

18. The non-transitory computer readable medium of claim 17, wherein the instructions stored thereon further comprise instructions, that when executed by the one or more hardware processors, cause the one or more hardware processors to, responsive to a failed validation of the response, perform at least one of the following:
  prevent access of the first entity to the response;
  terminate a process associated with processing the response; or
  disable a component of the computer device associated with providing the response.

* * * * *